United States Patent
Das et al.

(10) Patent No.: US 8,984,462 B1
(45) Date of Patent: Mar. 17, 2015

(54) PHYSICAL OPTIMIZATION FOR TIMING CLOSURE FOR AN INTEGRATED CIRCUIT

(71) Applicant: Xilinx, Inc., San Jose, CA (US)

(72) Inventors: Sabyasachi Das, San Jose, CA (US); Ruibing Lu, Santa Clara, CA (US); Zhiyong Wang, Cupertino, CA (US); Aman Gayasen, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/249,601

(22) Filed: Apr. 10, 2014

(51) Int. Cl.
*G06F 17/50* (2006.01)

(52) U.S. Cl.
CPC .................................. *G06F 17/5077* (2013.01)
USPC .......................................... 716/113; 716/132

(58) Field of Classification Search
USPC .................................................. 716/113, 132
See application file for complete search history.

(56) References Cited

U.S. PATENT DOCUMENTS 7,814,451 B2 * 10/2010 Furnish et al. ................ 716/100

OTHER PUBLICATIONS

Altera, *Quartus II Handbook Version 13.1, vol. 2: Design Implementation and Optimization*, QII52005-13.1.0, Nov. 2013, Chapter 12, pp. 12-1 to 12-46, Altera Corporation, San Jose, California, USA.
Altera, *Quartus II Handbook Version 13.1, vol. 2: Design Implementation and Optimization*, QII52007-13.1.0, Nov. 2013, Chapter 16, pp. 16-1 to 16-16, Altera Corporation, San Jose, California, USA.
Synopsis, *Synplify Premier, The Ultimate FPGA Implementation Platform*, Jan. 1, 2011, Synopsis, Inc., Mountain View, California, USA.

* cited by examiner

*Primary Examiner* — Thuan Do
(74) *Attorney, Agent, or Firm* — Kevin T. Cuenot (57) ABSTRACT

Physical optimization for timing closure for an integrated circuit includes processing a circuit design at least partially through a design flow to a late stage of the design flow. Using a processor, a baseline delay is calculated for each of a plurality of paths of the circuit design. A slack for each of the plurality of paths is determined. Physical optimization further includes selecting a path of the circuit design that meets a selection criterion according, at least in part, to the slack of the path, applying, using the processor, a physical optimization to the selected path resulting in an optimized path, and calculating a delay of the optimized path. The optimized path is incorporated into the circuit design only responsive to determining that the delay of the optimized path is less than the baseline delay of the selected path.

20 Claims, 3 Drawing Sheets

PHYSICAL OPTIMIZATION FOR TIMING CLOSURE FOR AN INTEGRATED CIRCUIT

TECHNICAL FIELD

This disclosure relates to integrated circuits (ICs) and, more particularly, to physical optimization for timing closure for an IC.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected or coupled by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data may be read from memory (e.g., from an external programmable read-only memory or PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to these devices and further may encompass devices that are only partially programmable. For example, one type of programmable IC includes a combination of hard-coded transistor logic and a programmable switch fabric that programmably interconnects the hard-coded transistor logic.

In order to implement a circuit design within an IC such as a programmable IC, the circuit design undergoes a process referred to as a design flow. The design flow generally includes synthesis, mapping, placement, and routing. Synthesis refers to the process of converting, or translating, an abstract, programmatic description of a circuit specified in a hardware description language (HDL) into a low-level design implementation. The abstract, programmatic description of the circuit describes behavior of the circuit and is also referred to as a "behavioral description" or a "register transfer level (RTL) description" of the circuit. The low level design implementation generated through synthesis typically is specified as inter-connected logic gates.

Once synthesized, the resulting low-level circuit implementation is mapped. Mapping is the process of correlating, or matching, the logic gates of the low-level circuit design to the various types of circuit blocks or resources that are actually available in the particular IC in which the circuit design is to be implemented, i.e., the "target IC." For example, since a lookup table (LUT) may implement a complex function, one or more logic gates of the low level design implementation may be mapped to a single LUT, or other programmable tile of the target IC. The mapped circuit design specifies the same functionality as the low level design implementation, albeit in terms of the particular circuit blocks available on the target IC as opposed to low-level logic gates.

Placement is the process of assigning elements of the mapped circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of the instance of the circuit block and/or resource on the target IC assigned to a circuit element of the circuit design is the location of that circuit element when placed. Routing is the process of selecting particular routing resources such as wires, PIPs, PIP settings, and/or other interconnect circuitry to electrically couple the various circuit blocks of the target IC.

Circuit designs may be evaluated against requirements set forth in a design specification after various stages of the design flow described above. Estimates of circuit design performance relating to timing, power consumption, or the like, may be compared with the requirements of the design specification to determine whether the requirements are met.

SUMMARY

A method includes processing a circuit design at least partially through a design flow to a late stage of the design flow. The method includes calculating, using a processor, a baseline delay for each of a plurality of paths of the circuit design, determining a slack for each of the plurality of paths, and selecting a path of the circuit design that meets a selection criterion according, at least in part, to the slack of the path. The method further includes applying, using the processor, a physical optimization to the selected path resulting in an optimized path, calculating a delay of the optimized path, and incorporating the optimized path within the circuit design only responsive to determining that the delay of the optimized path is less than the baseline delay of the selected path.

A system includes a processor programmed to initiate executable operations. The executable operations include processing a circuit design at least partially through a design flow to a late stage of the design flow. The executable operations include calculating a baseline delay for each of a plurality of paths of the circuit design, determining a slack for each of the plurality of paths, and selecting a path of the circuit design that meets a selection criterion according, at least in part, to the slack of the path. The executable operations further include applying a physical optimization to the selected path resulting in an optimized path, calculating a delay of the optimized path, and incorporating the optimized path within the circuit design only responsive to determining that the delay of the optimized path is less than the baseline delay of the selected path.

Also described is a non-transitory computer-readable medium having instructions stored thereon which, when executed by a processor, perform a method. The method includes processing a circuit design at least partially through a design flow to a late stage of the design flow and calculating, using a processor, a baseline delay for each of a plurality of paths of the circuit design. The method also may include determining a slack for each of the plurality of paths, selecting a path of the circuit design that meets a selection criterion according, at least in part, to the slack of the path, applying, using the processor, a physical optimization to the selected path resulting in an optimized path, and calculating a delay of the optimized path. The method includes incorporating the optimized path within the circuit design only responsive to determining that the delay of the optimized path is less than the baseline delay of the selected path.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to physical optimization for timing closure for an IC. In accordance with the inventive arrangements described within this disclosure, a circuit design undergoes a design flow. As used within this disclosure, the term "design flow" means performing synthesis, mapping, placement, and routing on a circuit design. At or near the end of the design flow, one or more physical optimizations are applied to the circuit design in order to improve timing and/or close timing. "Closing timing" means performing one or more operations upon a circuit design that does not meet one or more timing requirements in order to meet the timing requirement(s) for the circuit design.

As the design flow progresses, increasingly detailed information about the implementation of the circuit design within a target IC is available. The availability of detailed implementation information allows highly accurate estimates of circuit performance, as implemented within a particular target IC, to be determined. These estimates may be compared with the established requirements for the circuit design to determine whether the requirements are met.

In one aspect, selected paths are subjected to one or more physical optimizations. The selected paths may be any path that meets one or more selection criteria. In one example, paths that do not meet a timing requirement are subjected to one or more physical optimizations. In another example, paths may be selected to improve timing, e.g., by reducing the delay of the path even in cases where the path does meet a timing requirement.

The physical optimizations may be applied to the paths at or near the end of the design flow. For example, one or more physical optimizations may be applied subsequent to placement. In another example, one or more physical optimizations may be applied subsequent to routing. By performing the physical optimization(s) later in the design flow with the detailed implementation information that is available, any estimates of timing improvement achieved by the physical optimization(s) are highly accurate. As such, only those physical optimizations that result in an improvement in the timing of the circuit design are accepted. Physical optimizations that do not result in an improvement in the timing of the circuit design are rejected. Accordingly, the inventive arrangements described within this disclosure are virtually guaranteed not to degrade performance of the circuit design.

As an exemplary illustration, an electronic design automation (EDA) system may evaluate a circuit design that has been processed through a design flow. The resulting circuit design is routed. Because the EDA system has detailed information about the architecture of the IC such as circuit elements including interconnect circuitry, highly accurate estimates of timing for the routed circuit design may be calculated. Any paths that meet established selection criteria may be subject to optimization. For example, any paths of the circuit design that fail to meet a timing requirement for the path may be subject to optimization. Only changes to the path that result in an improvement in timing are accepted by the EDA system and incorporated into the circuit design. Otherwise, the optimization applied to the path is rejected and the original path is preserved in the circuit design.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
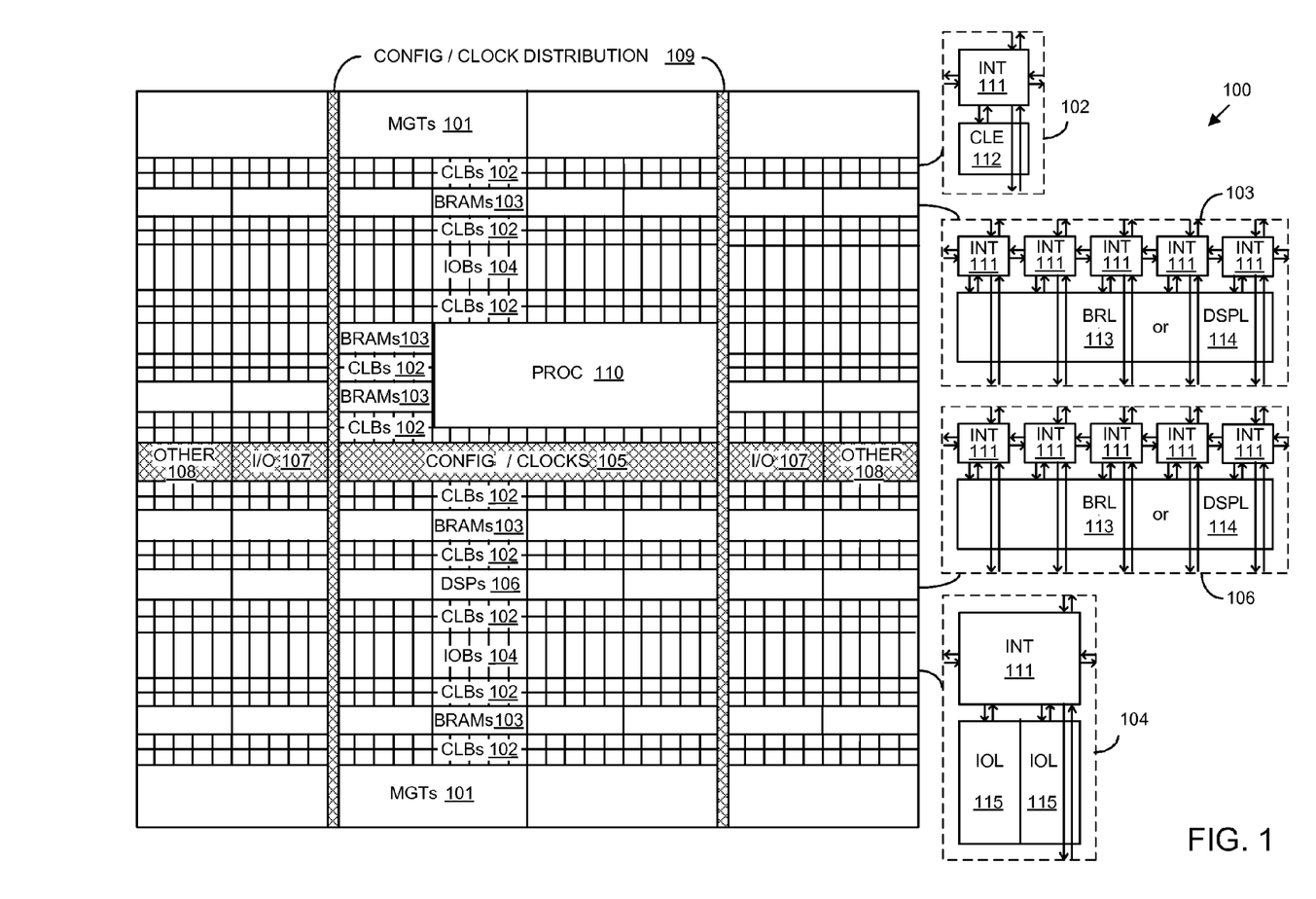
FIG. 1 is a block diagram illustrating an exemplary architecture for an integrated circuit (IC).

FIG. 1 is a block diagram illustrating an exemplary architecture 100 for an IC. In one aspect, architecture 100 is implemented within a field programmable gate array (FPGA) type of IC. As shown, architecture 100 includes several different types of programmable circuits, e.g., logic, blocks. For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs)

106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also can be used. A DSP tile 106 can include a DSP logic element (DSPL) 114 in addition to an appropriate number of INTs 111. An IOB 104 can include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die, e.g., formed of regions 105, 107, and 108, can be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks can be programmable blocks and/or dedicated circuitry. For example, a processor block depicted as PROC 110 spans several columns of CLBs and BRAMs.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems that execute program code. PROC 110 may range in complexity from an individual processor, e.g., a single core, to an entire processor system having one or more cores, modules, co-processors, interfaces, or the like.

In another aspect, PROC 110 is omitted from architecture 100 and replaced with one or more of the other varieties of the programmable blocks described. Further, such blocks can be utilized to form a "soft processor" in that the various blocks of programmable circuitry can be used to form a processor that can execute program code as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103 and BRAMs 103 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream."

In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 110 within the IC are for purposes of illustration only and are not intended as a limitation.

Figure 2:
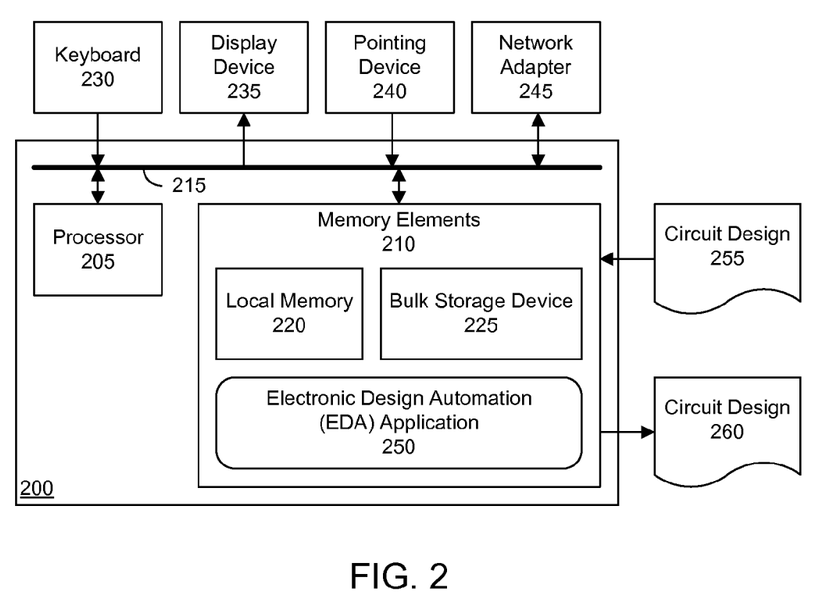
FIG. 2 is a block diagram illustrating an exemplary data processing system.

FIG. 2 is a block diagram illustrating an exemplary data processing system (system) 200. System 200 is an example of an EDA system. As pictured, system 200 includes at least one processor, e.g., a central processing unit (CPU), 205 coupled to memory elements 210 through a system bus 215 or other suitable circuitry. System 200 stores program code within memory elements 210. Processor 205 executes the program code accessed from memory elements 210 via system bus 215. In one aspect, system 200 is implemented as a computer or other data processing system that is suitable for storing and/or executing program code. It should be appreciated, however, that system 200 can be implemented in the form of any system including a processor and memory that is capable of performing the functions described within this disclosure.

Memory elements 200 include one or more physical memory devices such as, for example, a local memory 220 and a bulk storage device 225. Local memory 220 refers to random access memory or other non-persistent memory device(s) generally used during actual execution of the program code. Bulk storage device 225 can be implemented as a hard disk drive (HDD), a solid state drive (SSD), or other persistent data storage device. System 200 also can include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 optionally can be coupled to system 200. The I/O devices can be coupled to system 200 either directly or through intervening I/O controllers. A network adapter 245 also can be coupled to system 200 to enable system 200 to become coupled to other systems, computer systems, remote printers, and/or remote storage devices through intervening private or public networks. Modems, cable modems, Ethernet cards, and wireless transceivers are examples of different types of network adapter 245 that can be used with system 200.

As pictured in FIG. 2, memory elements 210 can store an EDA application 250. EDA application 250, being implemented in the form of executable program code, is executed by system 200. As such, EDA application 250 is considered part of system 200. System 200, while executing EDA application 250, receives and operates upon a circuit design 255. Circuit design 255 is a programmatic description of circuitry to be implemented within an IC. In one aspect, system 200 performs a design flow upon circuit design 255 that may include synthesis, mapping, placement, routing, and the application of one or more physical optimization techniques to be described within this disclosure in greater detail. In another aspect, circuit design 255 has been processed through one or more stages of a design flow that includes synthesis, mapping, placement, and/or routing. For example, placement may be complete or nearly complete for circuit design 255. In another example, routing may be complete or nearly complete for circuit design 255. In that case, system 200 may apply one or more physical optimizations as described within this disclosure to circuit design 255. In either case, system 200 generates an optimized, or modified, version of circuit design 255 that is pictured in FIG. 2 as circuit design 260.

EDA application 250, circuit design 255, circuit design 260, and any data items used, generated, and/or operated upon by EDA application 250 are functional data structures that impart functionality when employed as part of system 200 or when such elements, including derivations and/or modifications thereof, are loaded into an IC such as a programmable IC causing implementation and/or configuration of a circuit design within the programmable IC.

Figure 3:
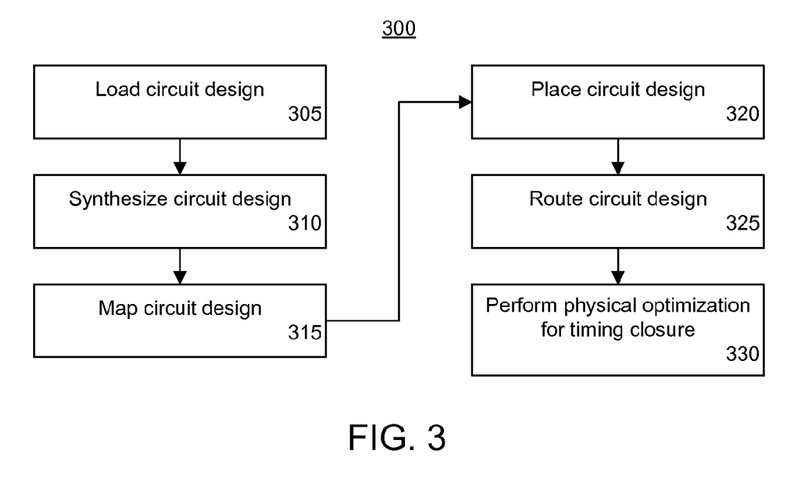
FIG. 3 is a flow chart illustrating an exemplary method of implementing a circuit design.

FIG. 3 is a flow chart illustrating an exemplary method 300 of implementing a circuit design within an IC. In one aspect, method 300 may be used to implement an circuit design within a programmable IC such as an FPGA. Method 300 is an example of a design flow used to process a circuit design. Method 300 may be performed by an EDA system such as the system described with reference to FIG. 2.

In block 305, the EDA system loads the circuit design. The circuit design, at least initially, may be a "behavioral description" of the circuit also referred to as a register transfer level (RTL) description. As such, the circuit design is specified using a hardware description language (HDL). In block 310, the EDA system synthesizes the circuit design. The EDA system processes the circuit design to generate a low level version of the circuit design specified as a plurality of interconnected logic gates.

In block 315, the EDA system maps the circuit design. The EDA system correlates, or matches, the logic gates of the synthesized circuit design with various types of circuit blocks or resources available in the particular IC in which the circuit design is to be implemented, i.e., the "target IC." In block 320, the EDA system places the circuit design. For example, the circuit elements that are mapped to a type of circuit block are assigned to a particular instance of that type of circuit block. The particular instance of that circuit block has a location on the target IC. Post placement, the location of the instance of the circuit block is the location of the circuit elements placed to the instance.

In block 325, the EDA system routes the circuit design. The system selects particular routing resources such as wires, PIPs, and/or other interconnect circuitry to electrically couple the various circuit blocks of the target IC allowing signals to be exchanged among the circuit blocks.

In block 330, the EDA system performs physical optimization upon the circuit design for timing closure. In one aspect, the system first determines whether any of the paths of the circuit design are critical. Critical paths may be processed using one or more optimization techniques. A "signal path" or "path" of a circuit design refers to a connection between at least two endpoints. Each endpoint of the path is a synchronous, or clocked, circuit element. One or more combinatorial, or un-clocked, circuit elements may be in the path.

A signal must be able to traverse a path of the circuit design within a finite and specified amount of time typically specified as a timing requirement within a design specification for the circuit design. Once a circuit design is routed, a highly accurate estimate of the time required for a signal to propagate each path of the circuit design can be calculated. The EDA system may calculate highly accurate estimates of delay because the architecture of the target IC is known and well defined. Further, the location of circuit components and the interconnection between the circuit components has been determined. The estimated time may be referred to as the delay or the estimated delay of the path. The delay then may be compared with the timing requirement for that path as specified within the design specification.

Those paths having a delay that exceeds the timing requirement are said, or classified, as critical paths. The term "slack" is used as a measure of criticality of a path. The "slack" of a path is defined as the delay of the path minus the timing requirement of the path. Accordingly, a negative slack value means that the delay of the path is larger, or worse, than the timing requirement. In one aspect, a path is considered critical in terms of timing when the slack of the path is negative. The larger the absolute value of the negative slack, e.g., the more negative the slack, the more critical the timing of the path. A positive slack value means that the path has a delay that is less than, or better, than the timing requirement.

Referring again to block 330, the physical optimization performed may include re-placing the circuit elements of one or more critical paths, re-routing one or more critical paths, or a combination of both re-placing and re-routing.

Figure 4:
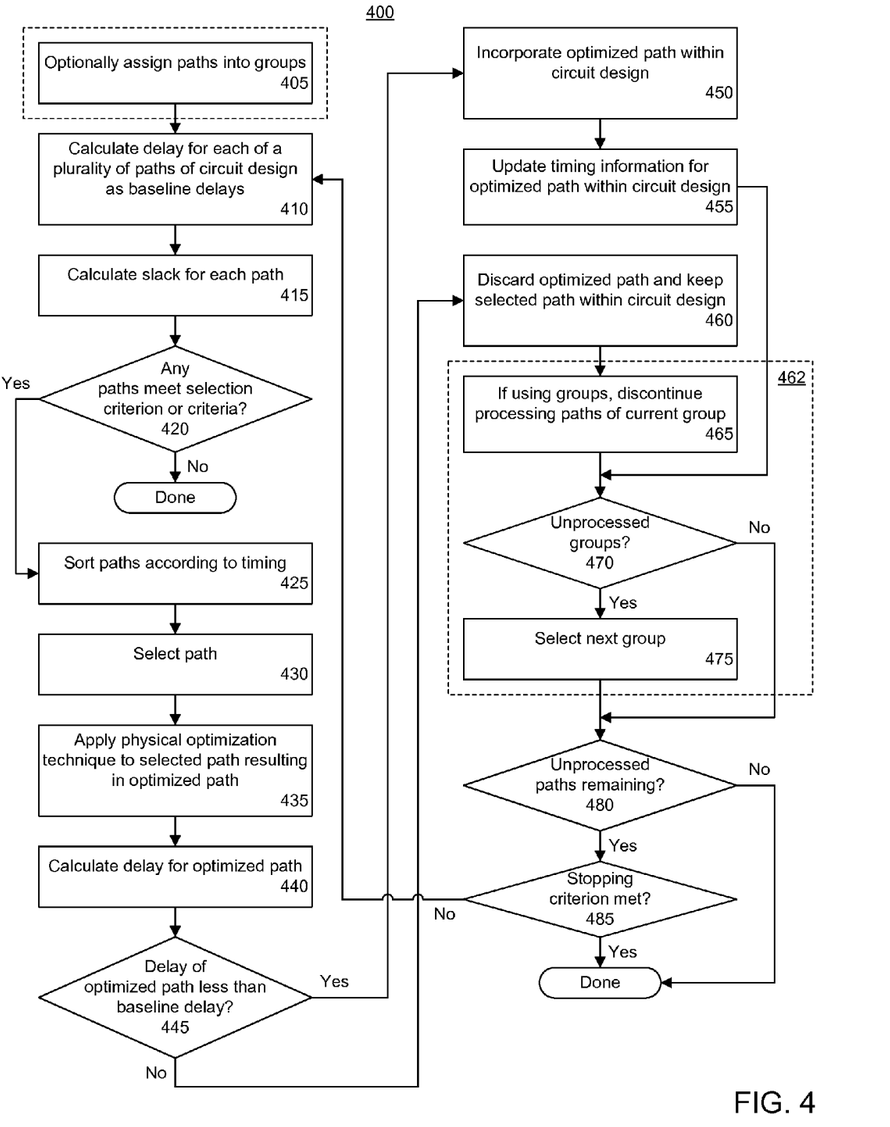
FIG. 4 is a flow chart illustrating another exemplary method of implementing a circuit design.

FIG. 4 is a flow chart illustrating another exemplary method 400 of implementing a circuit design. More particularly, method 400 is an exemplary implementation of block 330 of FIG. 3. Method 400 is an example of a physical optimization process that may be used to close timing of a circuit design to be implemented within a target IC. Like method 300, method 400 may be performed by an EDA system as described with reference to FIG. 2.

Within FIG. 4, blocks 405, 465, 470, and 475 are encompassed by rectangular blocks having dashed lines. Each of blocks 405, 465, 470, and 475 relates to processing groups of paths. As such, each of blocks 405, 465, 470, and 475 is only performed in the case where the EDA system does assign paths to groups. If the EDA system does not utilize path grouping, blocks 405, 465, 470, and 475 may be skipped or omitted.

Method 400 begins in block 405 where the EDA system optionally assigns paths into a plurality of different groups. In one aspect, groups are assigned according to clock domains. As such, each path may be assigned to a group representing the clock domain that includes the path. Each path within a same group is within a same clock domain. In the case where the EDA system does not utilize groups for purposes of processing paths, method 400 can skip block 405 and begin at block 410.

In block 410, the EDA system calculates the delay of the paths of the circuit design as baseline delays. As such, each delay calculated in block 410 is considered a baseline delay for a corresponding path. Physical optimization of the circuit design is performed in a late stage of the design flow. As used within this disclosure, the term "late stage," in reference to a design flow, means either after placement or after routing unless specifically stated to be after one or the other. Thus, in one aspect, the circuit design is routed prior to application of one or more physical optimizations. In another aspect, the circuit design is placed, but not yet routed, prior to application of one or more physical optimizations. In block 415, the EDA system calculates a slack for each path. As discussed, the slack of a path is the delay of the path minus the timing requirement of the path.

In block 420, the EDA system determines whether the circuit design includes any paths that are to be physically optimized. In one aspect, any path meeting one or more predefined selection criteria may be considered a path that is to be physically optimized. The selection criteria may depend, at least in part, upon slack of the paths. One example of a selection criterion is whether a path is a critical path. A critical path, as noted, is a path having a negative slack. Another example of a selection criteria is the difference between the timing requirement of the path and the slack of the path regardless of whether the slack of the path is negative. As an illustrative example, any path that meets a timing requirement but by less than a predetermined amount or percentage may be selected for physical optimization. If the circuit design does not include any paths meeting the selection criteria, method 400 ends. If the circuit design includes one or more paths meeting the selection criteria, method 400 proceeds to block 425.

In block 425, the EDA system sorts the paths meeting the selection criteria according to timing. Referring to critical paths, for example, the EDA system sorts the critical paths from those considered the most critical to those considered least critical. Thus, the EDA system sorts paths according to slack from most negative to least negative. In another aspect, the EDA system may sort paths according to the difference between the timing requirement of the path and the delay of the path, where paths are sorted from the smallest difference to the largest difference. In block 430, the EDA system selects a path for processing from the set of paths determined to meet the selection criteria. For example, the EDA system may select a path at the top of the sorted list, e.g., the most critical or the path with the smallest difference. If the EDA system has assigned the paths into different groups, the EDA system first selects a group of paths and, having selected a group, next selects a path meeting the selection criteria from the selected group.

In block 435, the EDA system applies a physical optimization technique to the selected path. In one aspect, the EDA system performs a placement optimization technique upon the selected path. For example, the EDA system may re-place circuit elements on the selected path. The re-placed circuit elements may include the synchronous endpoints of the path, combinatorial circuit elements along the path, or a combination of both. Because the physical optimization of the selected path is performed late in the design flow of the circuit design, the number of available sites may be limited. Notwithstanding, the EDA system may explore alternate placements for the selected path based upon the number and/or location of available sites.

In another aspect, the EDA system performs a routing optimization technique upon the selected path. For example, the EDA system may re-route the selected path or a portion of the selected path. The EDA system chooses one or more different wires and/or different PIP settings to establish connections between the synchronous circuit elements of the selected path, between non-synchronous circuit elements of the selected path, or between a synchronous circuit element and a non-synchronous circuit element of the selected path, or some combination of the foregoing. Again, because the physical optimization of the selected path is performed late in the design flow of the circuit design, the number of available, or unused, wires for re-routing the selected critical path may be limited. Notwithstanding, the EDA system may explore alternate routes for the selected path based upon the number and/or location of available wires as well as the location of the various circuit elements of the selected path to be re-routed.

In one exemplary illustration, the EDA system may evaluate circuit elements of the selected path and identify one or more circuit elements along the selected path that are common to one or more other selected and/or critical paths as the case may be. For example, the system may determine that, in addition to the selected path, at least one other path determined to meet the selection criteria for physical optimization flows through a node located in the selected path. In that case, were the circuit element common to the multiple paths to be re-placed, the segment of the selected path including the common circuit element to be re-routed, or some combination of both, the resulting optimization may lead to multiple paths, including the selected path, being rendered non-critical or less critical or otherwise having improved (i.e., faster) timing.

In block 440, the EDA system calculates the delay of the selected path as modified by the physical optimization(s) applied. For purposes of description, the selected path is referred to as the optimized path herein subsequent to the EDA system performing one or more physical optimization techniques upon the selected path. In block 445, the EDA system compares the delay of the optimized path with the baseline delay of the selected path. If the delay of the optimized path is less than the baseline delay of the selected path, method 400 continues to block 450. If the delay of the optimized path is not less than the baseline delay of the selected path, method 400 proceeds to block 460.

In block 450, the EDA system incorporates the optimized path within the circuit design. As used within this disclosure, incorporating the optimized path within the circuit design means replacing the selected path of the circuit design with the optimized path determined in block 435. In consequence, the circuit design no longer specifies, or includes, the selected path. Rather, the circuit design includes the optimized path in place of the selected path. In block 455, the EDA system updates timing information for the optimized path within the circuit design. In one aspect, the timing information includes the delay of the optimized path. In another aspect, the timing information further includes the slack for the optimized path. It should be appreciated that inclusion of the optimized path in the circuit design in replacement of the selected path may be performed responsive to determining that the optimized path has improved timing over the selected path. While the optimized path may not be critical, the optimized path may be critical but have improved delay compared to the selected path, e.g., be less critical or have a slack that is less negative.

Similarly, for a path that was non-critical, but selected for physical optimization, the path may have faster timing, e.g., a smaller delay.

Block 462 includes blocks 465, 470, and 475. As noted, each of blocks 465, 470, and 475 relates to processing groups and is only performed in the case where the EDA system does assign paths to groups. Accordingly, after block 455, method 400 continues to block 470 in the case where the EDA system does utilize path groups. In the case where the EDA system does not utilize path groups, method 400 continues directly to block 480 with blocks 470 and 475 being omitted or skipped.

Continuing with block 460, the EDA system has determined that the delay of the optimized path is not less than the baseline delay of the selected path. Accordingly, in block 460, the EDA system discards the optimized path and keeps the selected path within the circuit design. If the EDA system does not assign paths to groups, method 400 proceeds directly to block 480 from block 460. If the EDA system does assign paths to groups, method 400 continues to block 465.

In block 465, the EDA system discontinues processing paths of the currently selected group. The currently selected group is the group that includes the selected path. The EDA system stops processing any further paths from the group that includes the selected path. The EDA system may then select a different, or next, group. In block 470, the system determines whether any further unprocessed groups remain. If so, method 400 continues to block 475 where the EDA system selects a next group. If no further groups remain to be processed, method 400 proceeds to block 480.

In block 480, the EDA system determines whether any unprocessed paths selected for physical optimization remain. In the case where the EDA system assigns paths to groups, the determination of whether any unprocessed paths remain is limited to the currently selected group. In the case where the EDA system does not assign paths to groups, the determination of whether any unprocessed paths remain is performed across all remaining unprocessed paths meeting the selection criteria. If one or more paths remain to be processed, method 400 continues to block 485. If no further paths remain to be processed, method 400 ends.

In block 485, the EDA system determines whether a stopping criterion has been met. In one aspect, a stopping criterion specifies one or more conditions that, if met, cause the EDA system to stop processing paths and discontinue the physical optimization of the circuit design. One exemplary stopping condition is reaching a predetermined and maximum number of iterations. Another exemplary stopping condition is processing a maximum number of paths. If a stopping criterion is met, method 400 ends. If no stopping criterion is met, method 400 loops back to block 410 to continue processing.

The inventive arrangements described within this disclosure relate to performing physical optimization of a timing closure flow for a circuit design to be implemented within a target IC. In a late stage of a design flow, one or more physical optimization techniques are applied to the circuit design in order to improve and/or close timing. Because the physical optimizations are performed at the late stage of the design flow of the circuit design and the architecture of the target IC is known, the EDA system determines, with a high degree of certainty, whether the optimized path is an improvement over the original un-optimized path. Accordingly, the optimizations are guaranteed not to make timing of any path worse and/or critical path worse. Changes to the circuit design that result in greater delay and/or criticality of a path are rejected. Only those optimizations of paths that result in improved timing are incorporated into the circuit design.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining," "in response to detecting," "responsive to determining," or "responsive to detecting" depending on the context. Similarly, the phrase "if it is determined" or "if [a stated condition or event] is detected" may be construed to mean "upon determining," "in response to determining," "responsive to determining," "upon detecting [the stated condition or event]," "in response to detecting [the stated condition or event]," or "responsive to detecting [the stated condition or event]" depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a data storage medium which is a non-transitory computer-usable or computer-readable medium, storing program code that, when loaded and executed in a system including a processor, causes the system to initiate and/or perform at least a portion of the functions and/or operations described within this disclosure. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

An exemplary method includes processing a circuit design at least partially through a design flow to a late stage of the design flow. The method includes calculating, using a processor, a baseline delay for each of a plurality of paths of the circuit design, determining a slack for each of the plurality of paths, and selecting a path of the circuit design that meets a selection criterion according, at least in part, to the slack of the path. The method further includes applying, using the processor, a physical optimization to the selected path resulting in an optimized path, calculating a delay of the optimized path, and incorporating the optimized path within the circuit design only responsive to determining that the delay of the optimized path is less than the baseline delay of the selected path.

The method may include, responsive to determining that the delay of the optimized path is not less than the baseline delay of the selected path, discarding the optimized path and keeping the selected path within the circuit design.

The selection criterion may be that the path is critical. Accordingly, the method also may include sorting the critical paths of the plurality of paths from most critical to least critical prior to selecting the path of the circuit design.

In one aspect, the method includes assigning each of the plurality of paths to one of a plurality of groups. Responsive to determining that the delay of the optimized path is not less than the baseline delay of the selected path, processing of the selected path is discontinued, processing of further paths of the group including the selected path is discontinued, and a next path for processing is selected from a different group. In another aspect, each group represents a different clock domain.

The physical optimization may include at least partially re-routing the selected path and/or at least partially re-placing the selected path.

An exemplary system includes a processor programmed to initiate executable operations. The executable operations include processing a circuit design at least partially through a design flow to a late stage of the design flow. The executable operations include calculating a baseline delay for each of a plurality of paths of the circuit design, determining a slack for each of the plurality of paths, and selecting a path of the circuit design that meets a selection criterion according, at least in part, to the slack of the path. The executable operations further include applying a physical optimization to the selected path resulting in an optimized path, calculating a delay of the optimized path, and incorporating the optimized path within the circuit design only responsive to determining that the delay of the optimized path is less than the baseline delay of the selected path.

The executable operations may include, responsive to determining that the delay of the optimized path is not less than the baseline delay of the selected path, discarding the optimized path and keeping the selected path within the circuit design.

The selection criterion may be that the path is critical. Accordingly, the executable operations also may include sorting critical paths of the plurality of paths from most critical to least critical prior to selecting the path of the circuit design.

In one aspect, the executable operations include assigning each of the plurality of paths to one of a plurality of groups. The executable operations also include, responsive to determining that the delay of the optimized path is not less than the baseline delay of the selected path, discontinuing processing of the selected path, discontinuing processing of further paths of the group including the selected path, and selecting a next path for processing from a different group. In another aspect, each group may represent a different clock domain.

The physical optimization may include at least partially re-routing the selected path and/or at least partially re-placing the selected path.

Also described is a non-transitory computer-readable medium having instructions stored thereon which, when executed by a processor, perform a method. The method includes processing a circuit design at least partially through a design flow to a late stage of the design flow and calculating, using a processor, a baseline delay for each of a plurality of paths of the circuit design. The method also may include determining a slack for each of the plurality of paths, selecting a path of the circuit design that meets a selection criterion according, at least in part, to the slack of the path, applying, using the processor, a physical optimization to the selected path resulting in an optimized path, and calculating a delay of the optimized path. The method includes incorporating the optimized path within the circuit design only responsive to determining that the delay of the optimized path is less than the baseline delay of the selected path.

The method may include, responsive to determining that the delay of the optimized path is not less than the baseline delay of the selected path, discarding the optimized path and keeping the selected path within the circuit design.

The selection criterion may be that the path is critical. The method also may include sorting each of the plurality of paths from most critical to least critical prior to selecting a path of the circuit design.

In one aspect, the method includes assigning each of the plurality of paths to one of a plurality of groups. The method includes, responsive to determining that the delay of the optimized path is not less than the baseline delay of the selected path, discontinuing processing of the selected path, discontinuing processing of further paths of the group including the selected path, and selecting a next path for processing from a different group. In another aspect, each group represents a different clock domain.

The physical optimization may include at least partially re-routing the selected path and/or at least partially re-placing the selected path.

The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
   processing a circuit design at least partially through a design flow to a late stage of the design flow after placement;
   calculating, using a processor, a baseline delay for each of a plurality of paths of the circuit design after placement;
   determining a slack for each of the plurality of paths;
   selecting a path of the circuit design according, at least in part, to the slack of the path;
   applying, using the processor, a physical optimization to the selected path resulting in an optimized path;
   calculating a delay of the optimized path;
   comparing the delay of the optimized path with the baseline delay of the selected path; and
   incorporating the optimized path within the circuit design only responsive to determining that the delay of the optimized path is less than the baseline delay of the selected path.

2. The method of claim 1, further comprising:
   responsive to determining that the delay of the optimized path is not less than the baseline delay of the selected path, discarding the optimized path and keeping the selected path within the circuit design.

3. The method of claim 1, wherein critical paths are selected, the method further comprising:
   sorting critical paths of the plurality of paths from most critical to least critical prior to selecting the path of the circuit design.

4. The method of claim 1, further comprising:
   assigning each of the plurality of paths to one of a plurality of groups; and
   responsive to determining that the delay of the optimized path is not less than the baseline delay of the selected path, discontinuing processing of the selected path, discontinuing processing of further paths of the group including the selected path, and selecting a next path for processing from a different group.

5. The method of claim 4, wherein each group represents a different clock domain.

6. The method of claim 1, wherein the physical optimization comprises at least partially re-routing the selected path.

7. The method of claim 1, wherein the physical optimization comprises at least partially re-placing the selected path.

8. A system, comprising:
   a processor programmed to initiate executable operations comprising:
   processing a circuit design at least partially through a design flow to a late stage of the design flow after placement;
   calculating a baseline delay for each of a plurality of paths of the circuit design;
   determining a slack for each of the plurality of paths;
   selecting a path of the circuit design according, at least in part, to the slack of the path;
   applying a physical optimization to the selected path resulting in an optimized path;
   calculating a delay of the optimized path;
   comparing the delay of the optimized path with the baseline delay of the selected path; and
   incorporating the optimized path within the circuit design only responsive to determining that the delay of the optimized path is less than the baseline delay of the selected path.

9. The system of claim 8, wherein the processor is further configured to initiate executable operations comprising:
   responsive to determining that the delay of the optimized path is not less than the baseline delay of the selected path, discarding the optimized path and keeping the selected path within the circuit design.

10. The system of claim 8, wherein critical paths are selected, wherein the processor is further configured to initiate executable operations comprising:
    sorting critical paths of the plurality of paths from most critical to least critical prior to selecting the path of the circuit design.

11. The system of claim 8, wherein the processor is further configured to initiate executable operations comprising:
    assigning each of the plurality of paths to one of a plurality of groups; and
    responsive to determining that the delay of the optimized path is not less than the baseline delay of the selected path, discontinuing processing of the selected path, discontinuing processing of further paths of the group including the selected path, and selecting a next path for processing from a different group.

12. The system of claim 11, wherein each group represents a different clock domain.

13. The system of claim 8, wherein the physical optimization comprises at least partially re-routing the selected path.

14. The system of claim 8, wherein the physical optimization comprises at least partially re-placing the selected path.

15. A non-transitory computer-readable medium having instructions stored thereon which, when executed by a processor, perform a method comprising:
    processing a circuit design at least partially through a design flow to a late stage of the design flow after placement;

calculating, using a processor, a baseline delay for each of a plurality of paths of the circuit design;

determining a slack for each of the plurality of paths;

selecting a path of the circuit design that according, at least in part, to the slack of the path;

applying, using the processor, a physical optimization to the selected path resulting in an optimized path;

calculating a delay of the optimized path;

comparing the delay of the optimized path with the baseline delay of the selected path; and incorporating the optimized path within the circuit design only responsive to determining that the delay of the optimized path is less than the baseline delay of the selected path.

16. The non-transitory computer-readable medium of claim 15, wherein the method further comprises:

responsive to determining that the delay of the optimized path is not less than the baseline delay of the selected path, discarding the optimized path and keeping the selected path within the circuit design.

17. The non-transitory computer-readable medium of claim 15, wherein critical paths are selected, wherein the method further comprises:

sorting critical paths of the plurality of paths from most critical to least critical prior to selecting the path of the circuit design.

18. The non-transitory computer-readable medium of claim 15, wherein the method further comprises:

assigning each of the plurality of paths to one of a plurality of groups; and responsive to determining that the delay of the optimized path is not less than the baseline delay of the selected path, discontinuing processing of the selected path, discontinuing processing of further paths of the group including the selected path, and selecting a next path for processing from a different group.

19. The non-transitory computer-readable medium of claim 18, wherein each group represents a different clock domain.

20. The non-transitory computer-readable medium of claim 15, wherein the physical optimization comprises at least one of at least partially re-routing the selected path and at least partially re-placing the selected critical path.

* * * * *